UNITED STATES PATENT OFFICE.

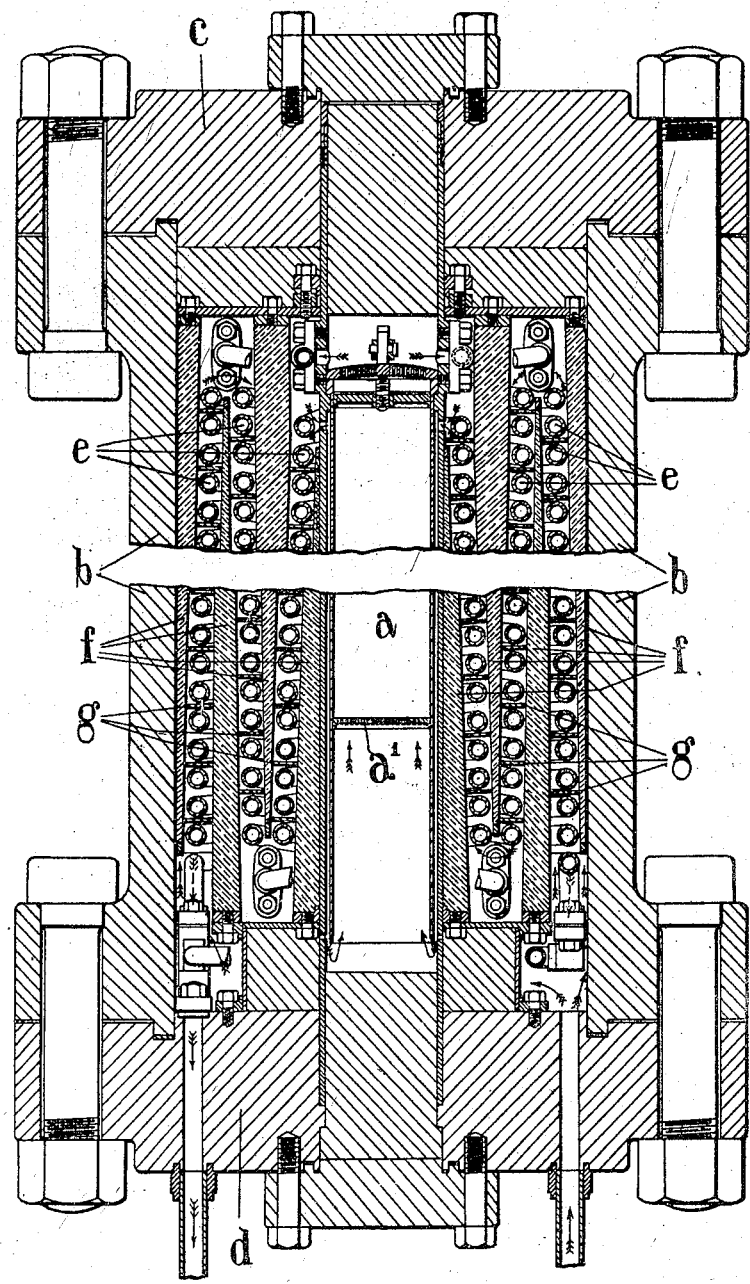

HAROLD CECIL GREENWOOD AND WILLIAM RONALD TATE, OF LONDON, ENGLAND.

CONSTRUCTION OF CATALYST-FURNACES.

1,335,891. Specification of Letters Patent. Patented Apr. 6, 1920.

Application filed March 26, 1919. Serial No. 285,217.

*To all whom it may concern:*

Be it known that we, HAROLD CECIL GREENWOOD and WILLIAM RONALD TATE, both subjects of the King of Great Britain, residing at Munitions Inventions Department, University College, Gower Place, London, W. C. 1, England, have invented certain new and useful Improvements in the Construction of Catalyst-Furnaces, of which the following is a specification.

This invention relates to catalyst furnaces such as are employed, for example, in the synthesis of ammonia or in similar gaseous reactions or operations carried out under high pressure and at elevated temperatures.

In such operations, for example, as the synthetic production of ammonia, only a relatively small proportion of the gases undergoes conversion during a single passage over the catalyst, and as heat losses are bound to occur during the conversion, it often results that even though the reaction be exothermic the requisite temperature of the system cannot be maintained unless external heat is applied to the system. This can be accomplished by external fuel heating which is relatively cheap but which involves considerable risk in the exposure of highly stressed metal to temperatures in the region of 400° to 700° C. Moreover, if the operation is carried out at temperatures over about 400° C., it is necessary to employ special carbon-free steels in order to avoid the lowering in strength of carbon steels which is bound to occur at such temperatures under the action of compressed hydrogen.

The disadvantages of supplying heat to the system by external fuel heating can be overcome by the use of electric energy which may conveniently be liberated within the walls of the vessel containing the catalyst or in another vessel or vessels traversed by the gas current on its way to the catalyst, the pressure-retaining walls of such vessel or vessels being maintained at a comparatively low temperature by the employment of lagging and/or heat interchange.

The disadvantage of electrical heating, however, is that it is relatively expensive and it is thus desirable to reduce to the lowest possible value the losses of heat from the catalyst container or other part of the system comprising catalyst and heat interchange. Such loss of heat may occur in two ways, namely: (1) by insufficient opportunity for heat interchange between the gases respectively entering and leaving the catalyst chamber or (2) by leakage of heat from the heated catalyst or from the heated portions of the heat interchanger to the walls of the vessel or, alternatively, from one part of the heat interchanger to another (cooler) part of the same.

The object of the present invention is to enable the electrical heating to be adopted with advantage by reducing the heat losses as far as possible in order to reduce the amount of electric energy that must be supplied, and therefore the cost of supplying the same while at the same time enabling the whole apparatus to be confined within a comparatively small space, since there is a definite limit to the size to which the outer pressure-resisting envelop or container can economically be constructed.

The invention consists in a catalyst furnace for use in operations of the character referred to, comprising a catalyst space and a heat interchanger surrounding said catalyst space and comprising one or more thermally insulating partitions shaped to suit the varying temperature gradient in the interchanger in order that heat lost may be reduced to the lowest possible value.

More specifically the invention consists in a catalyst furnace comprising a central catalyst space, a heat interchanger surrounding said catalyst space and comprising sets of coils for the passage of the gases in one direction separated from one another, from the catalyst space and from the outer pressure retaining wall by partitions of thermally insulating material wedge-shaped in cross-section.

The invention also comprises other details and arrangements hereinafter described or indicated.

The accompanying drawing illustrates in sectional elevation one convenient form of catalyst furnace in accordance with the invention.

In carrying our invention into effect in the manner illustrated as, for example, in its application to the construction of a catalyst furnace for use in the synthesis of ammonia, we form our improved furnace with a central tubular or other catalyst space *a* arranged within an outer pressure retaining wall *b* conveniently formed with upper and lower caps or covers *c d* bolted or otherwise secured in position, and between the catalyst space and the outer pressure-retaining wall we arrange the heat interchanger by which an interchange of heat is effected between the incoming and outgoing gases.

In one convenient construction the interchanger comprises coils or groups of coils $e$ preferably, but not necessarily, of circular section, through which the incoming or outgoing gases (preferably the latter) pass on their way to or from the central catalyst space, the coils being arranged in inclined rows so that they may be separated from one another and from the catalyst space and from the outer pressure-retaining wall by tapered or wedge-shaped partitions $f$ of thermal insulating material of suitable composition as for example such baffles may be formed of sheet iron filled with slag wool or other thermal insulating material. Such baffles form gas-tight passages inclosing or surrounding the coils or the like and through which the incoming gases pass on their way to the catalyst space, care being taken to eliminate the possibility of any other path. In this manner a complete heat interchange takes place between the incoming and outgoing gases and the form and arrangement of insulating baffles or partitions insures that the maximum thickness of insulating material is disposed at the points of greatest temperature gradient, and as the partitions are thus shaped to suit the varying temperature gradient, the available space within the outer pressure retaining vessel is utilized to the greatest advantage.

Individual turns of the heat interchanger coils or groups of turns (if several tubes are connected in parallel in the same set) may be separated by spirally arranged baffles $g$ in order to produce a complete counter current direction of flow for the gases and, if desired, such baffles or partitions may also be formed of heat insulating material in order to minimize the loss of heat from one turn or group of turns to an adjacent turn or group of turns.

An aperture or apertures (not shown) may be formed in the baffles in order to equalize the pressure throughout the interior of the apparatus and thus prevent mechanical rupture of the baffles taking place on any change of pressure within the main vessel. If more than one aperture be employed it is desirable that they should be in close proximity or in the same region from the point of view of pressure drop along the path of the gases in order to avoid any short-circuiting of the normal path of the gases.

A suitable electric heating device $a'$ may be disposed in a convenient position in the path of the hot gases leaving the heat interchanger, before entering the contact mass.

The arrangement of regenerator and baffles hereinbefore described offers considerable advantages in addition to those already enumerated as, for example, the avoidance of any material stresses due to differential expansion caused by inequality of temperature in the different parts of the heat interchanger, since no part of the interchanger partitions or catalyst is rigidly attached to both of the covers or ends of the main vessel, and the elastic nature of the coil is sufficient to take up any other slight differences in expansion.

A further advantage of the wedge-shaped arrangement of baffles lies in the ease with which the various parts may be assembled, since no friction occurs until the parts are brought into their final positions.

The spirals of the coils are preferably wound right and left-handed alternately.

It is to be understood that the invention is not to be confined to the foregoing details of construction, as we may modify the form, size and arrangement of the coil or coils or like conduits or containers through which the gases pass either to or from the catalyst space, the manner of forming the catalyst space and outer containing vessel and the means adopted for forming and assembling the various parts in position, depending upon the particular character of the operation for which the furnace is to be employed or other practical conditions that may have to be fulfilled.

Having now particularly described and ascertained the nature of our said invention and in what manner the same is to be performed, we declare that what we claim is:

1. A catalyst furnace comprising a catalyst space and a heat interchanger surrounding said catalyst space and comprising one or more thermally insulating partitions shaped to conform to the varying temperature gradient in the interchanger.

2. A catalyst furnace comprising a central catalyst space, a heat interchanger surrounding said catalyst space and comprising sets of coils for the passage of the gases in one direction, said sets being separated from one another, from the catalyst space and from the outer pressure retaining wall by partitions of thermally insulating material wedge-shaped in cross-section.

3. A catalyst furnace as claimed in claim 2 in which the coils or groups of coils are separated by spiral baffles.

In testimony whereof we have signed our names to this specification.

HAROLD CECIL GREENWOOD.
WILLIAM RONALD TATE.

Witnesses:
  EMILE BEST,
  H. MORIN.